(12) United States Patent
Stegall

(10) Patent No.: US 10,259,373 B1
(45) Date of Patent: Apr. 16, 2019

(54) MODULAR CONVERSION OF AUTOMOTIVE VEHICLE TO RECREATIONAL VEHICLE

(71) Applicant: Lannie Stegall, Lexington, KY (US)

(72) Inventor: Lannie Stegall, Lexington, KY (US)

( * ) Notice: Subject to any disclaimer, the term of this patent is extended or adjusted under 35 U.S.C. 154(b) by 0 days.

(21) Appl. No.: 15/640,652

(22) Filed: Jul. 3, 2017

(51) Int. Cl.
*B60R 13/00* (2006.01)
*B60P 3/34* (2006.01)
*B60R 15/02* (2006.01)
*B60P 3/39* (2006.01)
*G06Q 90/00* (2006.01)

(52) U.S. Cl.
CPC .................. *B60P 3/34* (2013.01); *B60P 3/39* (2013.01); *B60R 15/02* (2013.01); *G06Q 90/00* (2013.01)

(58) Field of Classification Search
CPC ...... C08L 2666/02; C08L 25/06; C08L 53/02; E03D 1/01; B29K 2021/00; B60T 8/175; F01N 2550/02; G01S 2013/9353; G07C 5/0858; H01M 4/16
USPC ...................................... 296/24.34
See application file for complete search history.

(56) References Cited

U.S. PATENT DOCUMENTS

| | | | | |
|---|---|---|---|---|
| 3,890,002 | A * | 6/1975 | Warmskessel | B60R 22/18 248/393 |
| 5,399,047 | A * | 3/1995 | Stegall | E03F 3/046 404/4 |
| 9,550,436 | B2 * | 1/2017 | Fenton | A61G 3/0808 |
| 2008/0136141 | A1 * | 6/2008 | Gray | B60R 22/202 280/727 |
| 2015/0042136 | A1 * | 2/2015 | Rajasingham | B60N 2/01 297/250.1 |
| 2015/0123427 | A1 * | 5/2015 | Faruque | B60J 5/0461 296/187.12 |
| 2017/0021773 | A1 * | 1/2017 | Brown | B60R 11/00 |
| 2017/0355348 | A1 * | 12/2017 | Koop | B60R 22/10 |
| 2018/0015851 | A1 * | 1/2018 | Goodhall | B60N 2/02 |
| 2018/0201375 | A1 * | 7/2018 | Browning | B64D 11/062 |

* cited by examiner

*Primary Examiner* — Kiran B Patel
(74) *Attorney, Agent, or Firm* — Stockwell & Smedley, PSC

(57) ABSTRACT

A modular recreational vehicle, including an automotive vehicle including a cabin, the cabin including a floor and a wall surrounding at least part of a cabin interior, the wall including a preformed anchor hole, and one or more modular amenities attached to an anchor, wherein the anchor is temporarily attached to the wall at the preformed anchor hole.

4 Claims, 13 Drawing Sheets

MODULAR CONVERSION OF AUTOMOTIVE VEHICLE TO RECREATIONAL VEHICLE

FIELD OF THE INVENTION

The present invention relates to recreational vehicles (RVs) and, more particularly, to converting an automotive vehicle into an RV.

BACKGROUND OF THE INVENTION

RVs can be either motor vehicles or towable trailers, and may be used for leisure activities such as camping and/or vacations. They may be found in RV parks or campgrounds, and can be rented in most major cities and tourist areas. They are occasionally used as mobile offices for business travelers, and in those instances may include customizations such as extra desk space, an upgraded electrical system, a generator, and satellite Internet. Other RVs serve as traveling permanent homes.

SUMMARY OF THE INVENTION

Embodiments of the present invention relate to a modular recreational vehicle, including a base automotive vehicle including a cabin, the cabin including a floor and a wall surrounding at least part of a cabin interior, and a modular amenity temporarily attached to the wall.

Further embodiments of the present invention include, in an automotive vehicle including a cabin, the cabin including a floor and a wall surrounding at least part of an interior of the cabin, the wall including a preformed anchor hole, a method for preserving the resale value of the automotive vehicle, including converting the automotive vehicle into a recreational vehicle by temporarily attaching one or more modular amenities to the preformed anchor hole by an anchor.

Additional embodiments of the present invention include a modular recreational vehicle, including an automotive vehicle including a cabin, the cabin including a floor and a first wall surrounding at least part of an interior of the cabin, the first wall including a plurality of preformed anchor holes; a freestanding, modular shower cabinet supported by the floor, the shower cabinet including a first anchor that is temporarily attached to the first wall at a first one of the plurality of preformed anchor holes; a freestanding, modular refrigerator cabinet supported by the floor, the refrigerator cabinet including a second anchor that is temporarily attached to the first wall at a second one of the plurality of preformed anchor holes; a bedframe including a first portion supported by the first wall and a second portion supported by the second wall; and a water tank under the bedframe, the water tank including a whitewater tank in fluid communication with a whitewater hose and a shower head of the shower cabinet and a graywater tank in fluid communication with a drain of the shower cabinet and a graywater hose.

DETAILED DESCRIPTION OF THE PREFERRED EMBODIMENTS

Figure 1:
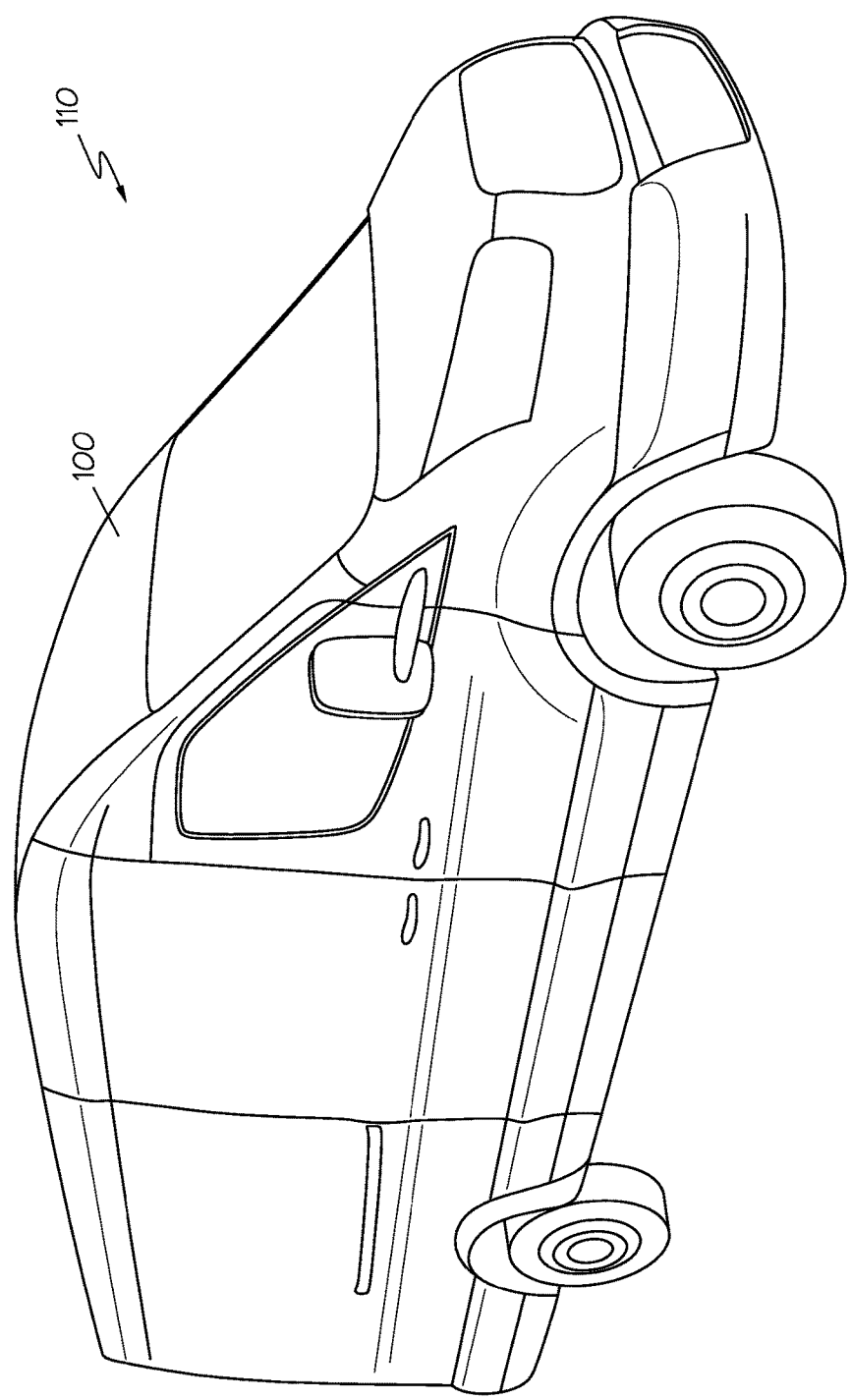
FIG. 1 depicts an exterior view of an example automotive vehicle to be fitted with temporarily attached RV amenities in accordance with the principles of the present invention.

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the present application, "about" means within plus or minus one at the last reported digit. For example, about 1.00 means 1.00±0.01 unit. In fractions, about 1 1/16 units means from 1 0/16 units to 1 2/16 units.

In the present application, "permanently attached" means that the attachment and/or detachment of the elements in permanent attachment (e.g. during installation, uninstallation, etc.) would damage or destroy one or more of the elements, or an object or surface of one or more of the permanently attached elements.

In the present application, "temporarily attached" means that the detachment of the elements in temporary attachment would not damage or destroy one or more of the elements, an object or surface of one or more of the elements, nor an object or surface to which the element is temporarily attached.

In the present application, "damage" means to cause structural alteration beyond mere cosmetic alteration.

In the present application, "amenities" refers to one or more of: a shower, a refrigerator, a bedframe, cabinets, a microwave, a sink, a television, a desk, a washer, a dryer, or any other home fixture that may be found in a recreational vehicle. The term, "amenities," or any amenity described herein with reference to embodiments of the present invention refers to a modular version of the amenity, unless otherwise noted. A modular amenity is an amenity that is temporarily attached to the base automotive vehicle. A modular amenity may be freestanding, such that the amenity has sufficient structural integrity to remain upright when a base of the amenity rests on a floor, the ground, or a similar support.

"Substantially," as used herein with reference to a shape, means within manufacturing tolerance of manufacturing the referenced shape as well as any other shape falling within the doctrine of equivalents for the referenced shape.

"Substantially similar," as used in this application, means having at least each of the properties of the referenced structure plus additional structure disclosed and any changes disclosed. If the additional structure conflicts, the additional structure supersedes the structure incorporated by reference.

"Proximate," as used herein to describe a position of an element relative to one object of a set of multiple objects, conveys that the element is positioned closer to the one object than any other object of the set. The set of objects may be inferred from the circumstances. For example, if in the description "proximate" the top of an element is referenced, the element is inferred to comprise a top and a bottom. Furthermore, the reference means that the proximate element is closer to the top than the bottom of the referenced element (e.g. the top and the bottom are the set of multiple objects used for reference).

In the present application, the "interior of the vehicle" in the context of attachment of an object means that the object is attached to at least one of a wall, a floor, a flooring, a roof or a ceiling of the interior of the vehicle.

For the purposes of this disclosure, "and" and "or" shall be construed as conjunctively or disjunctively, whichever provides the broadest disclosure in each instance of use.

RVs can be either motor vehicles or towable trailers, and may be used for leisure activities such as camping and/or vacations. They may be found in RV parks or campgrounds, and can be rented in most major cities and tourist areas. They are occasionally used as mobile offices for business travelers, and in those instances may include customizations such as extra desk space, an upgraded electrical system, a generator, and satellite Internet. Other RVs serve as traveling permanent homes.

However, the conventional interior amenities of RVs are integral to the structure of the RV itself. For example, a tow-behind camper may be constructed from a fiberglass body, and may expand by pop-out frame and fabric coverings. Several or all of the conventional amenities may be integrally formed with or permanently attached to the fiberglass body. Furthermore, in self-propelled motorhomes comprising a vehicle and conventional amenities, several or all of the conventional amenities may be integrally formed with or permanently attached to the vehicle. Each amenity, whether conventional or modular, exhibits the risk of damage independently. Furthermore, due to the permanent attachment of the conventional amenities to the RV, each conventional amenity may only be replaced with great difficulty and, in some instances, may not be replaceable. Therefore, the entire value of the RV, including the underlying vehicle, may depend on the condition of the conventional amenities.

Thus, there exists a need for amenities that are temporarily attached to the underlying vehicle. Such amenities may be replaceable and/or removable. For example, an automotive vehicle, such as a cargo van, may be fitted with temporarily attached amenities to form an RV. Furthermore, the RV may be repurposed once the amenities are worn and then removed. The underlying automotive vehicle may then have a depreciated value based on mileage and age independently of the condition of the interior amenities. Therefore, the automotive vehicle may retain value after deterioration of the interior amenities or after removal of the interior amenities.

FIG. 1 depicts an exterior view of an example automotive vehicle 100 to be fitted with temporarily attached RV amenities in accordance with the principles of the present invention. For example, the Ford Transit may provide a suitable platform to be used as the underlying vehicle for an RV according to the principles of the present invention. The sample dimensions may be as follows: Cargo volume: about 246.7 to about 487.3 ft$^3$; Example interior cargo dimensions may be about 126" at Floor to seat 1 in length, about 70.2" in width at beltline, and about 72" in height; Exterior dimensions: about 220-266" L×about 81" W×about 84-109" H; Towing capacity: 5,200 to 6,000 lbs.; Gross vehicle weight rating: 9,000 lbs.; Fuel tank capacity: about 25 gal.

Figure 2:
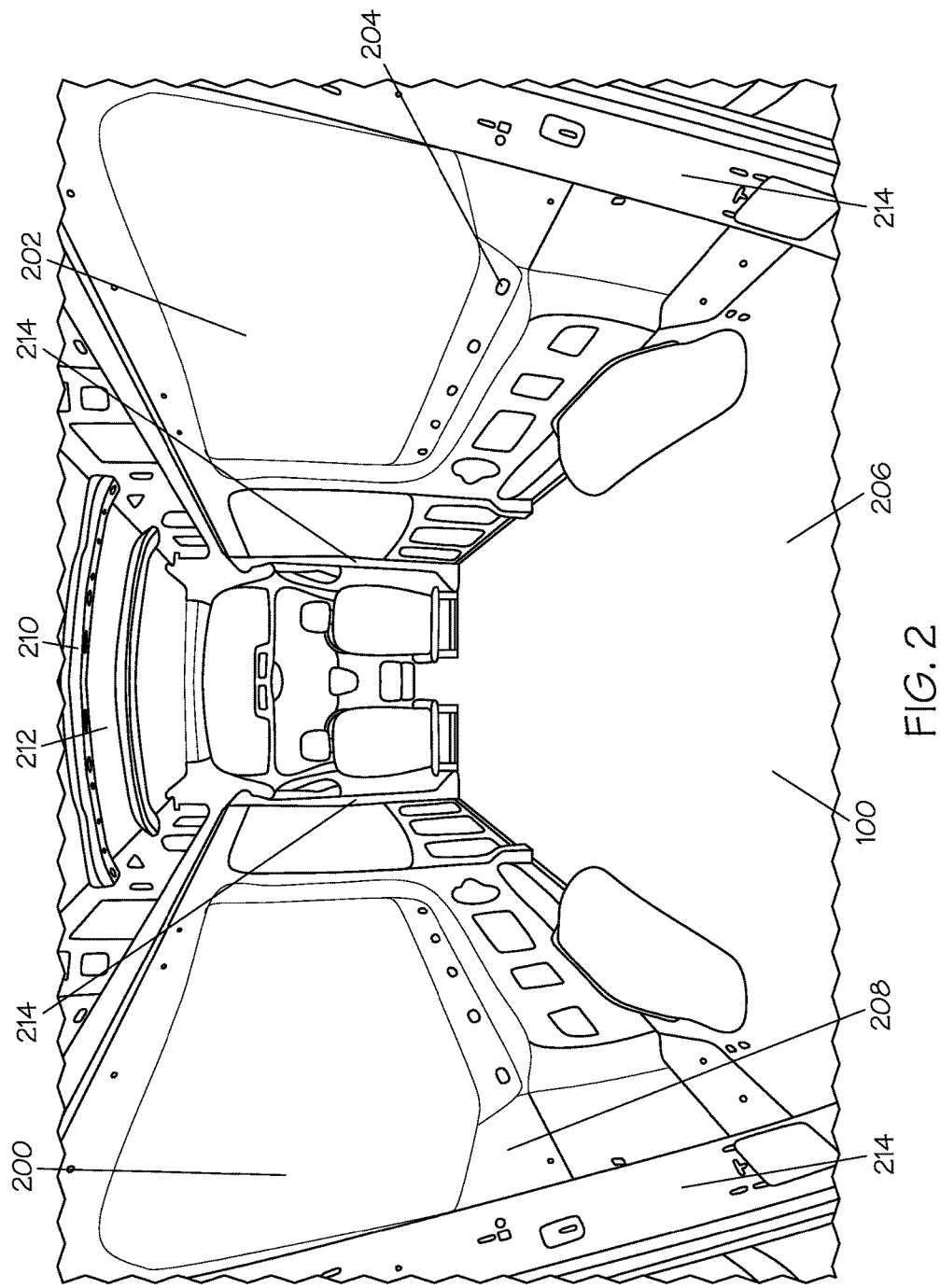
FIG. 2 depicts an interior view of the automotive vehicle of FIG. 1 in accordance with the principles of the present invention.

FIG. 2 depicts an example interior view of the vehicle 100 of FIG. 1 in accordance with the principles of the present invention. Regarding an interior 200 of the vehicle 100, the Ford Transit offers multiple configurations from its three available body lengths and three roof heights. Cargo volumes range from about 246 cu. ft. (regular wheelbase and low roof) to over about 487 cu. ft. (long wheelbase/extended body and high roof). The Transit may carry heavy loads with payloads up to 4,650 lbs. as well as ladder racks with a capacity up to 420 lbs. that can be added.

The interior 200 may comprise walls 202. The walls 202 may comprise one or more anchor holes 204 that are formed during the manufacture of the automotive vehicle 100 or during the manufacture of the individual body panels that form the automotive vehicle 100. The one or more anchor holes 204 may be preformed in the walls 202 or wall panels (e.g. at the factory before consumer use). These anchor holes 204 may provide a structure for temporary attachment of the RV amenities to the vehicle 100 such that the walls 202 may not necessarily be damaged by installation and/or removal of the RV amenities. The walls 202 may further comprise one or more protruding support columns 214. These columns 214 may provide structural support for the walls 202. Furthermore, the columns 214 may extend into the cargo space from the wall 202 by at least a portion of a width of the column 214.

Vehicle floor 206 may also be present between the walls 202 as part of the vehicle 100. Vehicle floor 206 may be rubberized. In other embodiments, the vehicle floor may be a plastic, a composite material, and may be carpeted.

The roof 212 may be supported by roof struts 212. The roof struts 212 may comprise recesses and/or anchor holes similar to anchor holes 204.

Collectively, the interior space of the automotive vehicle 100, behind the front row captain's chairs, surrounded by the walls 202 and the floor 206 may be referred to as the cabin 208.

Figure 3:
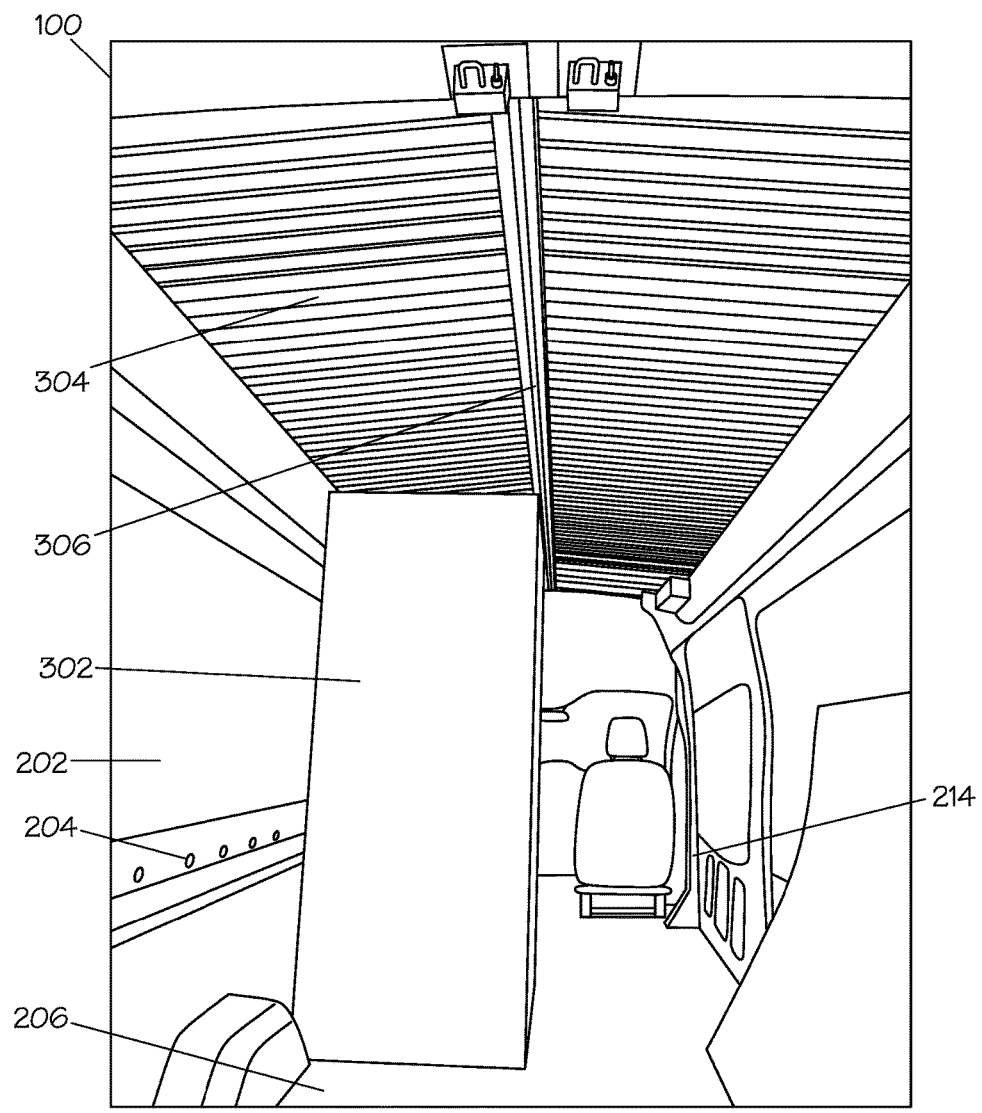
FIG. 3 depicts an interior view of the automotive vehicle of FIG. 1 comprising an installed shower cabinet in accordance with the principles of the present invention.

FIG. 3 depicts an interior view of the automotive vehicle 100 of FIG. 1 comprising a temporarily attached shower cabinet 302 in accordance with the principles of the present invention. Shower cabinet 302 may comprise a shower pan, shower surrounds, structural support, and a decorative cabinet wrapper. For example, the shower pan and surrounds may be similar to those sold in a home improvement store and sized for a single person walk-in shower. The structural support may comprise a wooden, metal, plastic, or composite base on which the shower surround are permanently attached. Furthermore, the structural support may form a shower base. The shower pan may be permanently attached to walls of the structural support and/or the shower base. Furthermore, the structural support may be wrapped by a decorative cabinet outer, such as a cabinet formed of wood, metal, plastic, and/or composite. This decorative cabinet may be permanently attached to the structural support.

The shower cabinet 302 may be freestanding. Freestanding means that the wall 202 is not required for structural integrity, strength, or support for the shower cabinet 302 to remain upright. Although the shower cabinet 302 may remain upright with support of the floor, the shower cabinet 302 may slide along the floor 206, if further restraint is not implemented. Therefore, when the shower cabinet 302 is temporarily attached to the wall 202, the attachment may prevent the shower cabinet 302 from tipping and/or sliding during sudden changes in velocity and/or acceleration.

Figure 5:
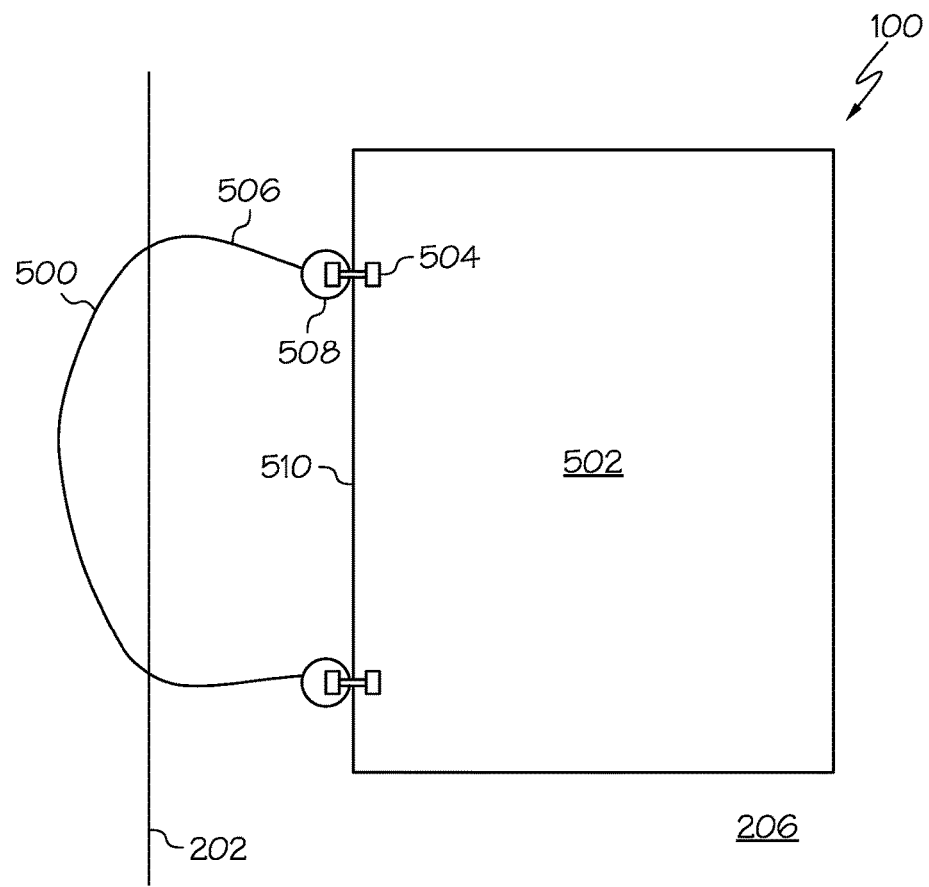
FIG. 5 depicts a diagram of an attachment of an amenity to an interior wall of the automotive vehicle in accordance with the principles of the present invention.
Figure 6:
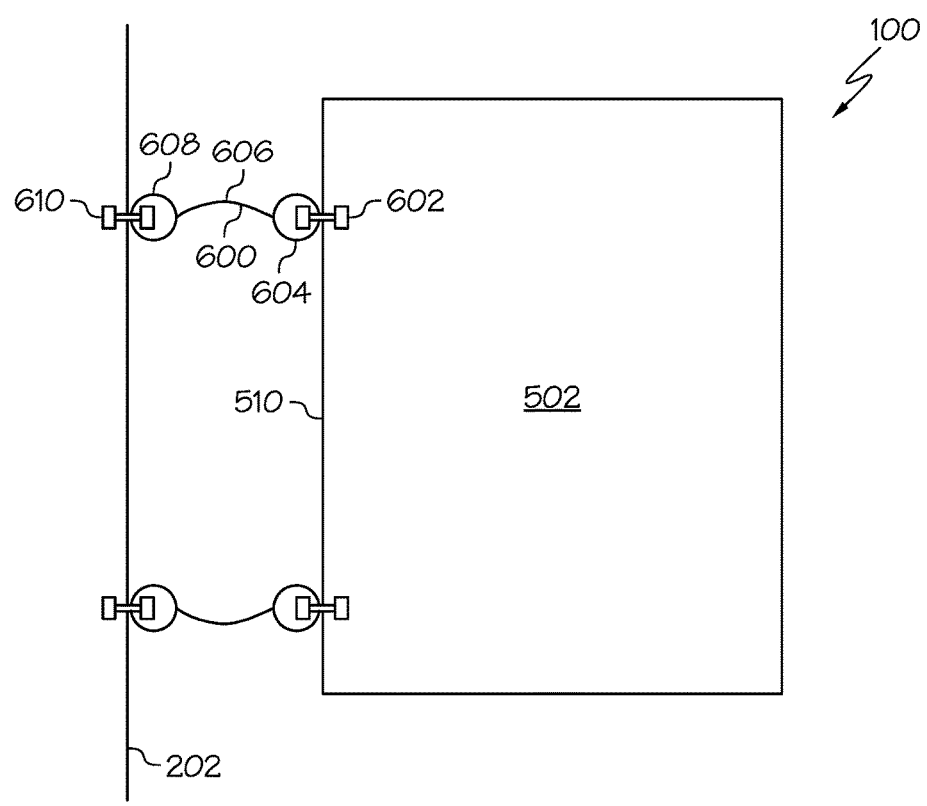
FIG. 6 depicts a diagram of an alternate attachment of the amenity of FIG. 5 to the interior wall of the automotive vehicle in accordance with the principles of the present invention.
Figure 7:
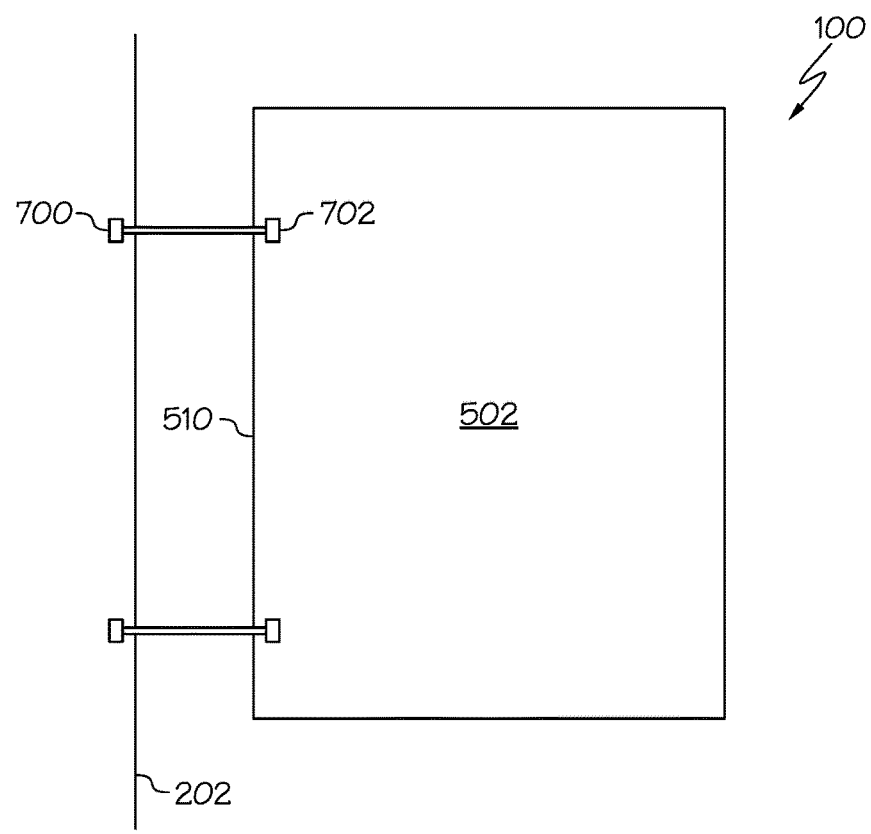
FIG. 7 depicts a diagram of another alternate attachment of the amenity of FIG. 5 to the interior wall of the automotive vehicle in accordance with the principles of the present invention.

However, the shower cabinet 302 may be temporarily attached to the wall 202 (further explained with respect to FIGS. 5-7). In typical RVs, a conventional amenity may be permanently attached to the base vehicle or trailer by quarter inch screws. In some embodiments of the present invention, the shower cabinet may be bolted to steel wire. The steel wire may then be bolted to an anchor hole 204. In some embodiments, the vehicle 101 may not necessarily be damaged by removal of the shower cabinet 302 from the automotive vehicle 100. In other embodiments, neither the vehicle 101 nor the shower cabinet 302 are necessarily damaged by removal of the shower cabinet 302. In this manner, the steel wire may prevent tip-over of the shower cabinet 302. In further embodiments, a flooring may be placed such that the bottom of the shower cabinet may be prevented from sliding along floor 206.

Furthermore, a ceiling 304 may be temporarily attached to the interior of the automotive vehicle 100. For example, the ceiling 304 may be temporarily attached to the roof 212, the roof struts 210, and or the walls 202 (proximate the roof 212 relative to the floor 206). The ceiling 304 may comprise sheet metal, composites, plastics, or any other sound-insulating material. The ceiling 304 may reduce the transmission of noise from outside the RV to the inside. The ceiling 304 may be supported by a spine 306 that may span the length of the ceiling 304. The spine 306 may be positioned along the widthwise midpoint of the ceiling 304. The spine 306 may be attached to the ceiling by any of the anchors described with respect to FIGS. 5-7. For example, the spine 306 may be attached to an anchor, whether permanently or temporarily. The anchor may be temporarily attached to an anchor hole in the roof 212 and/or the roof struts 212. Alternatively, the spine 306 may be temporarily attached to roof struts 210 by any anchor described herein. In some embodiments, the spine 306 may be attached by clips or hooks to the roof struts 210.

Figure 4:
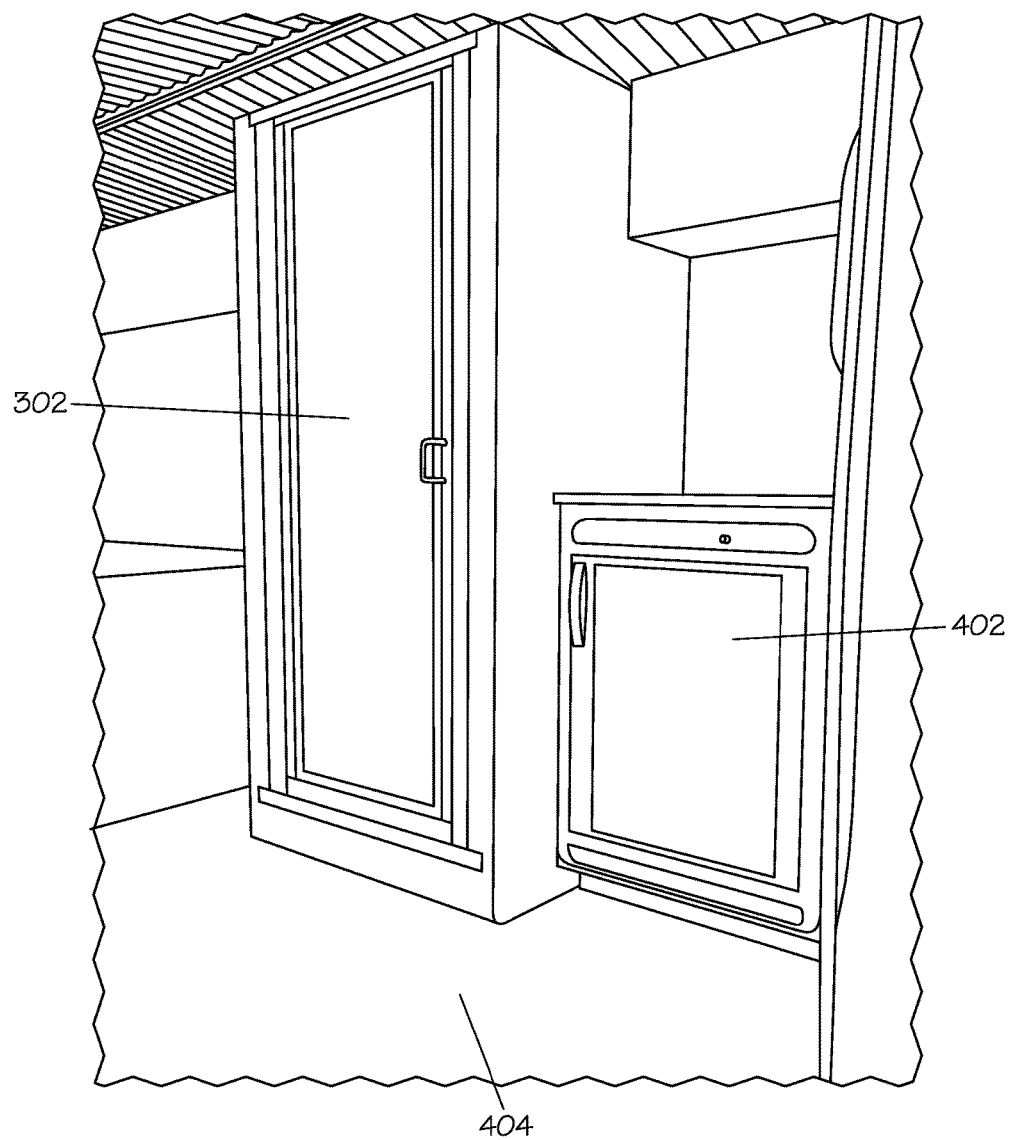
FIG. 4 depicts an interior view of the automotive vehicle of FIG. 3 further comprising an installed refrigerator cabinet and flooring in accordance with the principles of the present invention.

FIG. 4 depicts an interior view of the automotive vehicle 100 of FIG. 3 further comprising an installed refrigerator cabinet 402 and flooring 404 in accordance with the principles of the present invention. As depicted, shower cabinet 302 may rest on floor 206. Flooring 404 may be built-up on top of floor 206. By way of example, flooring 404 may comprise snap-fit floating hardwood cut to fit around a base of the modular amenity, such as the shower cabinet 302. Thus, the edge of flooring 404 may rest against the bottom of the sides of the shower cabinet 302. In embodiments wherein the flooring 404 comprises solid hardwood, the flooring thickness may between about 0.79 cm (⁵⁄₁₆ ") to about 1.90 cm (¾ "). In embodiments wherein the flooring 404 comprises engineered hardwood, the thickness may be between about 0.95 cm (⅜ ") to about 1.27 cm (½ "). In this manner, the bottom of the shower cabinet 302 may be prevented from sliding along floor 206.

Furthermore, refrigerator cabinet 302 may comprise a refrigerator, a refrigerator cabinet support, and a decorative cabinet. The refrigerator may comprise a commercially available Norcold mini-refrigerator. The refrigerator cabinet support may comprise wood, metal, plastic, composite, or any other material having similar structural integrity. The refrigerator cabinet support may be attached to the outside of the refrigerator, and may be permanently attached. The decorative cabinet may be attached to the refrigerator cabinet support, and may be permanently attached. The refrigerator cabinet 402 may be temporarily attached to the wall 202. The temporary attachment of the refrigerator cabinet 402 to the wall 202 may be similar in all respects to the temporary attachment of the shower cabinet 302 to the wall 202.

The refrigerator cabinet 302 may rest on floor 206. An edge of flooring 404 may rest against the bottom of one or more of the sides of the refrigerator cabinet 402. Furthermore, another edge of flooring 404 may rest against the bottom of one or more sides of one or more protruding wall supports 214. In this manner, opposing edges may engage the supports 214 and the refrigerator cabinet 302 (or other amenity) during changes in velocity. Thus, the flooring 404 may prevent the sliding of amenities, such as the refrigerator cabinet 302 when the automotive vehicle moves 100.

FIG. 5 depicts a diagram of an attachment of an amenity 502 to an interior wall 202 of the automotive vehicle 100 in accordance with the principles of the present invention.

The modular amenity 502 may be freestanding. Freestanding means that additional outside support, such as the wall 202, is not required for structure integrity, strength, or support for the amenity 502 to remain upright. Although the amenity 502 may remain upright on its own (but may be supported by the floor 206 due to placement thereon), the amenity 502 may slide along the floor 206, if further restraint is not implemented. Therefore, when the amenity 502 is temporarily attached to the wall 202, the attachment may prevent the amenity 502 from tipping and/or sliding, such as when sudden changes in velocity and/or acceleration.

By way of example, the amenity 502 may be the shower cabinet 302. The amenity 502 may be temporarily attached to wall 202 by an anchor 500 at or through the predrilled anchor hole (not depicted). The anchor 500 may comprise one or more of a bolt 504, a wire loop 508, and/or a wire 506. The wire 506 may be a steel wire, metal wire, or any other strong wire. For example, the wire may be 6,000 lb. pull rated during tensile strength tests.

Furthermore, the anchor 500 may be permanently attached to the amenity 502. This permanent attachment may be formed by a bolt 504 securing a wire loop 508 to the amenity cabinet 510 and/or support structure (not depicted).

For example, the bolt 504 may comprise a nut, a head, and one or more washers to prevent the bolt head and/or nut from pulling through the amenity cabinet 510. The nut and the head of the bolt 504 are not labeled, because the direction of the bolt is interchangeable.

The wire loop 508 may be secured to or integrally formed with the wire 506 such that the wire loop does not reduce the test tensile strength of the wire 506.

The preformed anchor holes 204 can be envisioned at the points of intersection of the wire 506 and the wall 202. In these embodiments, the wire 506 may pass through two respective predrilled anchor holes 204 and may further be permanently attached to the amenity 502.

FIG. 6 depicts a diagram of an alternate attachment of the amenity 502 of FIG. 5 to the interior wall 202 of the automotive vehicle 100 in accordance with the principles of the present invention. In these embodiments, the amenity 502 may be attached to one or more respective wire loops 604 by one or more respective bolts 602. For example, the amenity 502 may be attached to two respective anchors 600 and the anchors 600 temporarily attached to the wall 202. The attachment of the anchor 600 to the amenity 502 may be permanent, if a hole is created through the cabinet 510 for the bolt 602. This attachment may be temporary, if the hole is preformed in the cabinet 510 by the manufacturer. The wire loop 604 may be attached to wire 606, which may be attached to wire loop 608. Wire loop 608 may, in turn, be temporarily attached to wall 202 at an anchor hole 204 by bolt 610.

In these embodiments, anchor 600 may comprise two wire loops 604 and 608 connected by a wire 606. The wire loops 604 and 606 may be similar in all respects to the wire loop 506. The wire 606 may be similar in all respects to wire 506. The bolts 602 and 610 may be similar in all respects to bolt 504.

In other embodiments, the bolt 610 may comprise a molly bolt; a toggle bolt; a straight bolt, a nut, and optionally a washer; an S-hook; etc. One of ordinary skill would recognize other possibilities for similar temporary attachment.

In some embodiments, bolt 602 may be similar to bolt 610 and may additionally include screws or other structure altering attachments.

FIG. 7 depicts a diagram of another alternate attachment of the amenity 502 of FIG. 5 to the interior wall 202 of the automotive vehicle 100 in accordance with the principles of the present invention. In these embodiments, the amenity 502 may be anchored directly to the wall 202 by one or more anchors 700. The anchor 700 may comprise a bolt 702 that passes directly through the cabinet 510 and/or support structure of the amenity 502. The bolt 702 may further pass through the anchor hole 204 of the wall 202. The bolt 702 may be similar in all respects to bolt 610.

Figure 8:
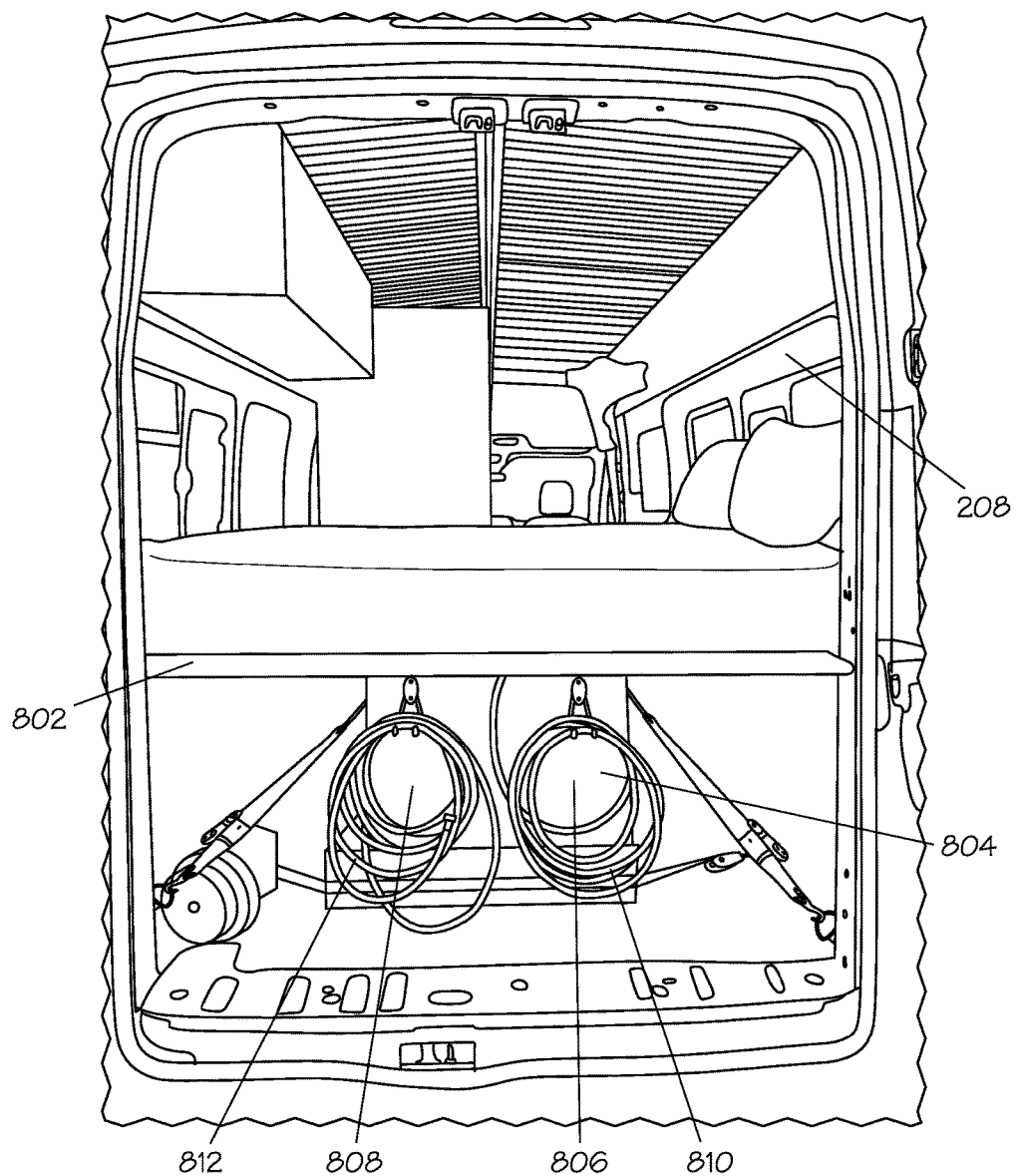
FIG. 8 depicts an interior view of the automotive vehicle of FIG. 3 further comprising a raised bed over water storage.

FIG. 8 depicts an interior view of the automotive vehicle 100 of FIG. 3 further comprising a raised bed over a water storage 804. The raised bed may comprise a bedframe 802 that may be temporarily attached to two or more walls 202. Examples of the temporary attachment include those described with respect to FIG. 5-FIG. 7. Further attachments include hooks and integral support of the automotive vehicle 100. For example, the bedframe 802 may rest on one or more wall supports 216. In some embodiments, the bedframe 802 may comprise pillars that reach the floor 206 and support the bed. In some embodiments, the bedframe 802 may prevent any components positioned under the bed from sliding out from under the bed toward the driver. Example structures include pillars and/or a wall under the bedframe 802.

The bedframe 802 may be positioned proximate the rear of the vehicle. For example, the bedframe 802 attachment to wall 202 may be similar to that of the shower cabinet 302 to the wall 202. A mattress may be positioned on the bedframe 802. In some embodiments, the bedframe 802 may allow for conversion of the bed into a day couch.

Electrical components or water storage 804 may be positioned under the bedframe 802. Example electrical components include a pump, an inverter, a switch, a battery, etc. For example, the pump may be in electrical communication with the inverter and/or a power source, such as a battery. The pump may intake water to the whitewater storage 806 via the whitewater hose 810. The pump may further output water from the graywater storage 808 via graywater hose 812. In some embodiments, separate pumps may be used for the whitewater storage 806 and the graywater storage 808.

In some embodiments, the battery may be located under the hood, rather than under the bedframe 802. The battery may be in electronic communication with the inverter through the switch. The battery may supply direct current to the automotive vehicle systems or the RV systems (e.g. the pump, certain interior lights, water heater, if equipped, etc.). In some embodiments, the switch may be used to selectively supply electrical power to either the automotive vehicle systems or the RV systems. One exception may be that the air conditioning of the automotive vehicle may be powered through the battery when the RV systems are powered and when the automotive systems are powered. In this manner, the factory air conditioning of the automotive vehicle 100 may be used both for automotive vehicle use and RV use. When the RV systems are powered, the direct current of the battery may be supplied to an inverter, which may provide alternating current to the RV systems, when necessary. In some embodiments, an outlet may receive an electrical power connection from an outlet at a campsite through the back door. For example, electrically-powered amenities may be similar to amenity 502 and may further be in electrical communication with a power source, such as the battery or a campsite electrical outlet.

The water storage 804 may comprise one or more water tanks. For example, the water storage 804 may comprise whitewater storage 806 and graywater storage 808. Whitewater storage 806 may comprise a first tank and graywater storage 806 may comprise a second tank. These tanks may be in fluid communication via one or more hoses and through one or more water-using amenities, similar to amenity 502. For example, the shower cabinet 302 may be in fluid communication with the whitewater storage 806 via a pump and/or hose to output water through a shower head. Furthermore, a drain of the shower cabinet 302 may be in fluid communication with the graywater storage 808 via a hose and/or a pump. Embodiments of the present invention include routing the hoses and/or pipes connecting the water-using amenities and the water storage 804 without requiring a non-factory hole in the automotive vehicle 100. In this manner, the hoses and/or pipes may be flexible. The hoses and/or pipes may be routed against the wall 202, above the ceiling 304, and/or under or beside the flooring 404. A connection similar to that of the shower cabinet 302 may be used with other water using amenities, such as a sink, in some embodiments. The pump may be an electrically-powered component of the RV system.

The water storage 804 or any of its components may be positioned under the bedframe 802. Thus, the water storage 804 or any of its components may be positioned proximate the rear of the vehicle. Due to this position, a whitewater hose 810 may replenish the whitewater tank 806 without cutting or requiring a non-factory hole in the automotive vehicle 100 (e.g. through the rear door). Furthermore, graywater hose 812 may release the contents of the graywater tank 808 through the back door without requiring or cutting a non-factory hole. Whitewater may comprise fresh water directly taken from a clean water source. Whitewater may or may not be potable. Whitewater may be stored such that the whitewater does not become contaminated by the graywater or blackwater.

The water storage may comprise a graywater storage 808. Graywater may comprise waste water from the sinks and/or showers. Graywater is not necessarily considered "clean", but it is also not considered as "dirty" as blackwater. RVs may comprise LED warning systems that can indication a full graywater tank, such as when the lowest drain backs up (e.g. the shower drain). This can become of particular importance for when using washing machines. RV washers can use large amounts of water, and that water may quickly fill the graywater tank.

The water storage 804 may comprise a blackwater storage (not depicted). Alternatively, the blackwater storage may be independent of the water storage 804. Blackwater may comprise wastewater from the toilet, such as human waste. The blackwater storage may comprise a tank that stores the blackwater. When full, the operator of the RV may connect a sewer hose from the blackwater storage to a suitable sewer connection at their camp site or a dump station for emptying. This connection may not necessarily be left open: If the water is allowed to constantly drain off, the solids tend to remain behind, which may require replacement of the blackwater tank.

The whitewater storage 806 may be in fluid communication with the shower cabinet 302 such that whitewater may be expelled from a shower head within the shower cabinet 302. The whitewater storage 806 may be in fluid communication with a sink, a washer, or other water-using amenity. The whitewater storage 806 may further comprise a whitewater hose 810. The whitewater hose 810 may be stored inside the cabin with the whitewater storage 806. In fact, the whitewater hose 810 may pass through a rear door of the automotive vehicle 100 such that the whitewater storage 806 may be refilled without cutting a hole through the automotive vehicle 100. For example, the whitewater hose 810 may have sufficient length based on the position of the water storage 804 to reach out a back door of the automotive vehicle 100 to refill the whitewater.

Furthermore, the graywater storage 808 may comprise a graywater hose 812. The graywater hose 812 may have sufficient length based on the position of the water storage 804 to drain the graywater through a back door of the automotive vehicle 100.

The shower cabinet 302 may further comprise a drain. The shower cabinet 302 may be configured such that used whitewater flows through the drain. The drain may be in fluid communication with a graywater and/or a blackwater tank, such that drained water is stored in the corresponding water storage 804.

The water storage 804 may be temporarily attached to the interior of the cabin, such as to wall 202, the floor 206, and/or the bedframe 502.

Other water-using amenities may also comprise a drain that may drain water to the graywater tank 808 and/or blackwater tank.

The shower cabinet 302 may comprise a portable toilet. The portable toilet may be in fluid communication with the whitewater tank 806 and/or graywater tank 808. The portable toilet may be a 3.5 gallon toilet. Such as toilet may allow for 55 flushes before refreshing the toilet. Water received from these tanks may be used to flush the toilet. Furthermore, the toilet may comprise a blackwater tank. In these embodiments, the portable toilet may be fully removable from the shower cabinet 302. In some embodiments, the toilet may be in fluid communication with a blackwater tank, such that flushing releases waste and water to the blackwater tank. In some embodiments, the blackwater tank may be stored outside the cabin 208.

Figure 9:
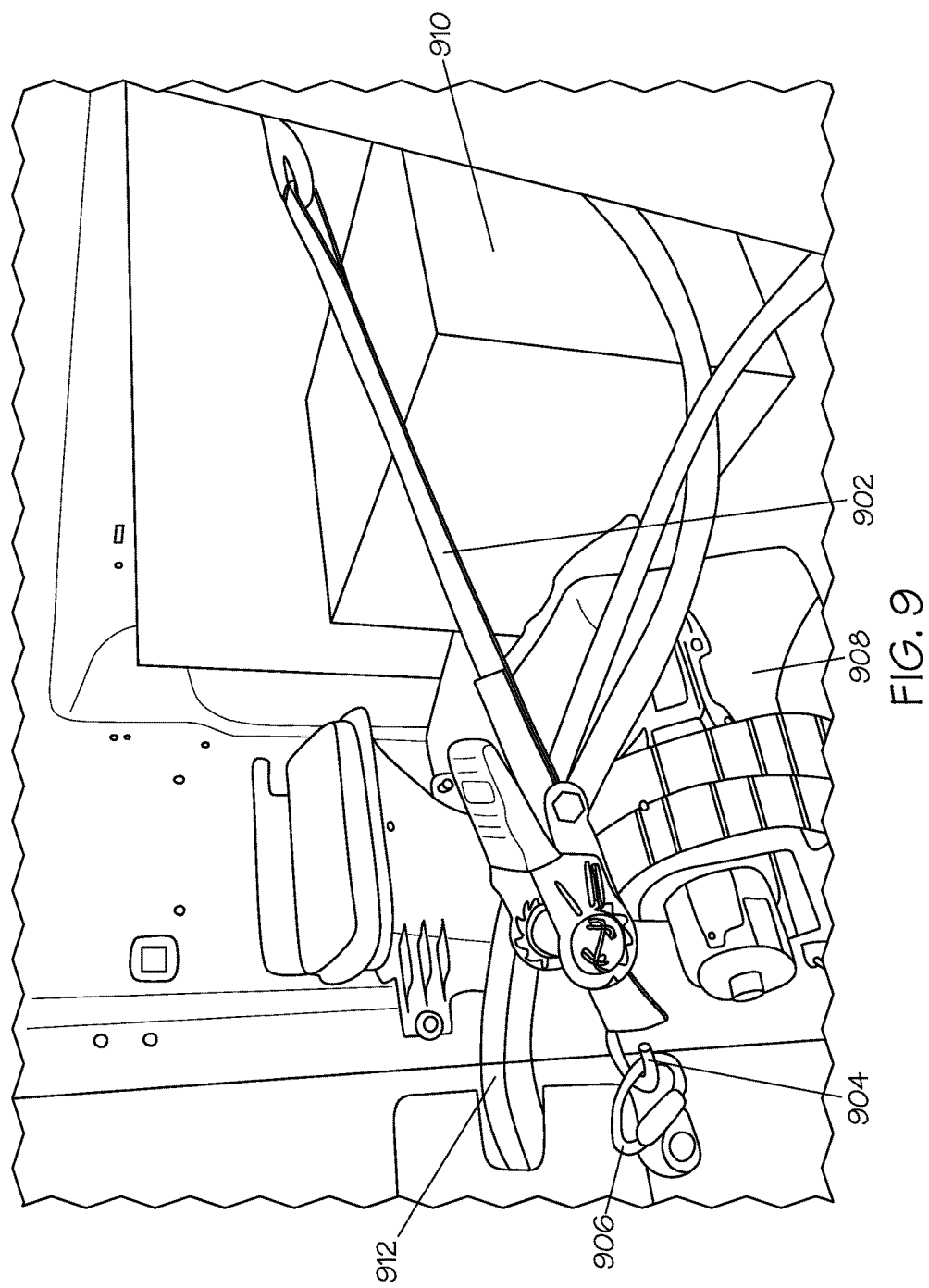
FIG. 9 depicts an interior view of the automotive vehicle of FIG. 8 further comprising the temporary attachment of the water storage under the raised bed.

FIG. 9 depicts an interior view of the automotive vehicle 100 of FIG. 8 further comprising the temporary attachment of water storage 804 to the wall. Furthermore, electrical power components may also be temporarily attached to the interior of the vehicle under the raised bedframe 802. By way of example, the water storage 804 may be anchored by a ratchet strap 902 to a wall 202. The ratchet strap may comprise an S-hook 904 as an anchor 500 for temporary attachment to the wall 202. The anchor 500 may further comprise a ring 906 attached to the wall 202. The electrical components may further comprise a pump 908. The pump 908 may be electrically powered. For example, the electrical power may be supplied through the battery or an electrical outlet. Direct current may be converted into alternative current by the inverter 910 before powering the pump 908. Furthermore, hoses 912 may supply whitewater to the water-using amenities from the whitewater storage 806 and/or may return graywater to the graywater storage 808. For example, water transport may be accomplished without the water and/or hoses 912 exiting the vehicle. Alternatively, water transport by the hoses 912 may occur without requiring additional, non-factory holes in the vehicle 100.

In a conventional RV, refilling the whitewater storage and/or emptying the graywater storage may occur through the wall of the interior, through a body panel, and/or through the floor. For example, hoses (e.g. similar to hoses 912) may be passed through the wall, a body panel, and/or the floor. Alternatively, these hoses may be connected to a coupling that may extend through, or partially through, the wall, the body panel, and/or the floor. In this manner, conventional RVs may be manufactured with water transport holes configured to allow a hose or coupling to transport water through the wall, the body panel, and/or the floor. Alternatively, some conventional RVs have water transport holes cut through the wall, the body panel, and/or the floor after manufacture to allow water transport from the interior of the cabin to the exterior of the RV, or from the exterior to the interior. However, water transport holes may coincide with increased depreciation of the conventional RV. Embodiments of the present invention include transporting the water from the interior of the vehicle to the exterior, or form the exterior to the interior, without water transport holes. For example, the hoses 912 may be run through an at least partially open back door for refilling or emptying the water tank 804. Alternatively, the hoses 912 could be passed through a window of the vehicle 100.

Figure 10:
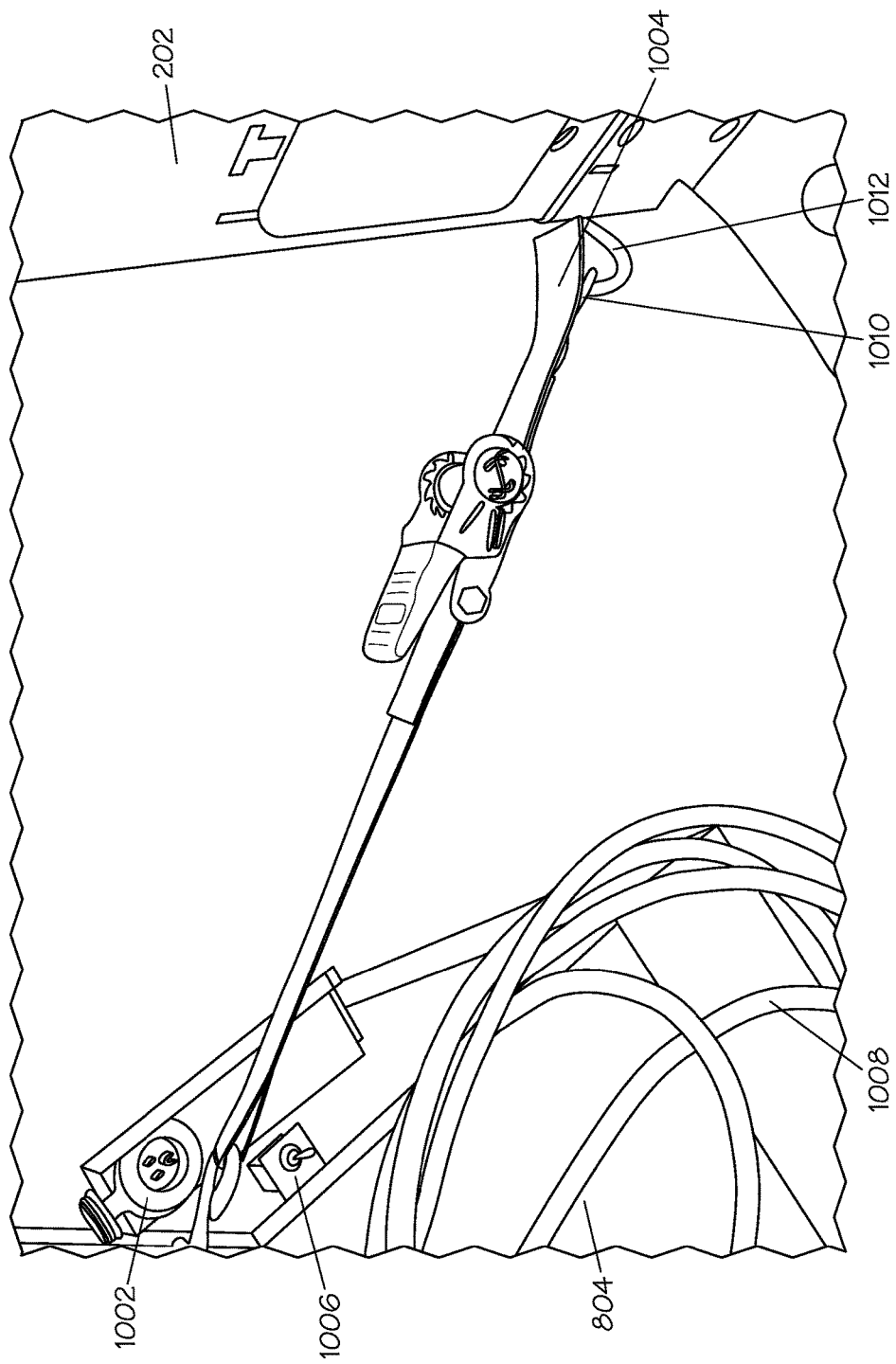
FIG. 10 depicts an interior view of the automotive vehicle of FIG. 8 further comprising the temporary attachment of water storage and electrical power components under the raised bed.

FIG. 10 depicts an interior view of the automotive vehicle 100 of FIG. 8 further depicting the temporary attachment of the water storage 804 and electrical components to the interior of the automotive vehicle 100 under the raised bedframe 802. By way of example, the electrical components may be anchored by a ratchet strap 1004 to a wall 202. The ratchet strap 1004 may be attached in a manner similar to that of ratchet strap 902. Ratchet strap 1004 may comprise an S-hook 1010 that is similar in all respects to S-hook 904. S-hook 1010 may be hooked to ring 1012. Ring 1012 may be similar in all respects to ring 906. In some embodiments, rings 906 and 1012 may be temporarily attached to the floor 206.

By way of example, some of the electrical components may include outlet 1002 and switch 1006. The outlet 1002 may be connected to an outlet (such as a campsite electrical outlet) by an extension cable. The switch 1006 may alternate electrical power, based on position, to either the RV systems or the vehicle systems. For example, extension cable 1008 may also be stored under bedframe 802.

Figure 11:
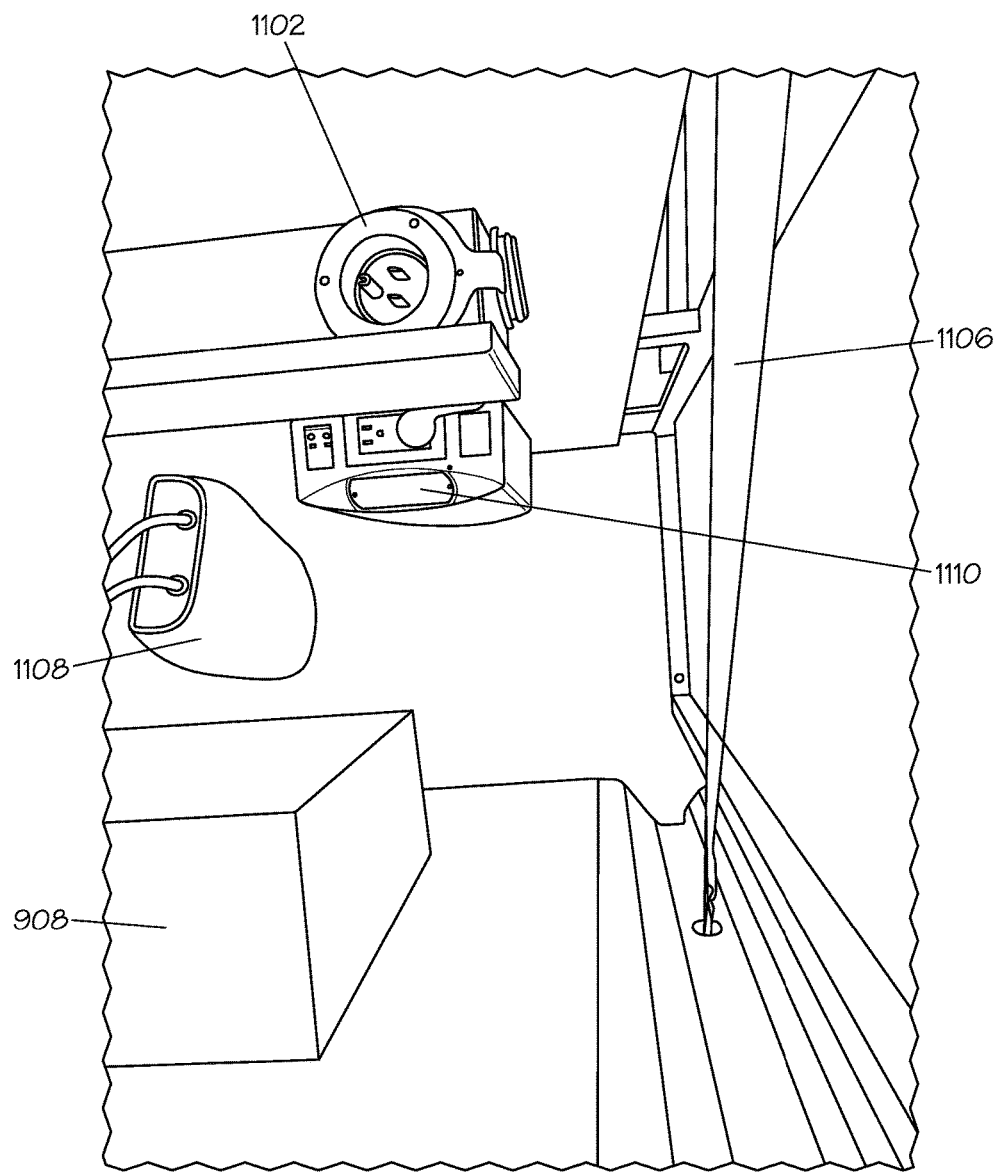
FIG. 11 depicts an alternate interior view of the automotive vehicle of FIG. 8 further depicting the temporary attachment of electrical components under the raised bed.

FIG. 11 depicts an alternate interior view of the automotive vehicle 100 of FIG. 8 further depicting the temporary attachment of electrical components under the raised bed. Further example attachments may include a strap 1106 connecting the bedframe 802 to the floor to prevent the bedframe 802 from sliding. Electrical components 1108 and 1110 may comprise one or more of: batteries, amplifiers, ac to dc converters (e.g. to charge the battery from a campsite outlet), inverters, pumps, step-down and/or step-up regulators, generators, or any other electrical component necessary to provide electrical current or regulate appropriate voltage or amperage to one or more parts of the RV electrical system and/or one or more electrically powered amenities. Outlet 1102 may be provided and may be similar in all respects to outlet 1002.

By way of example, the electrical components depicted herein may be direct current or alternating current components.

Figure 12:
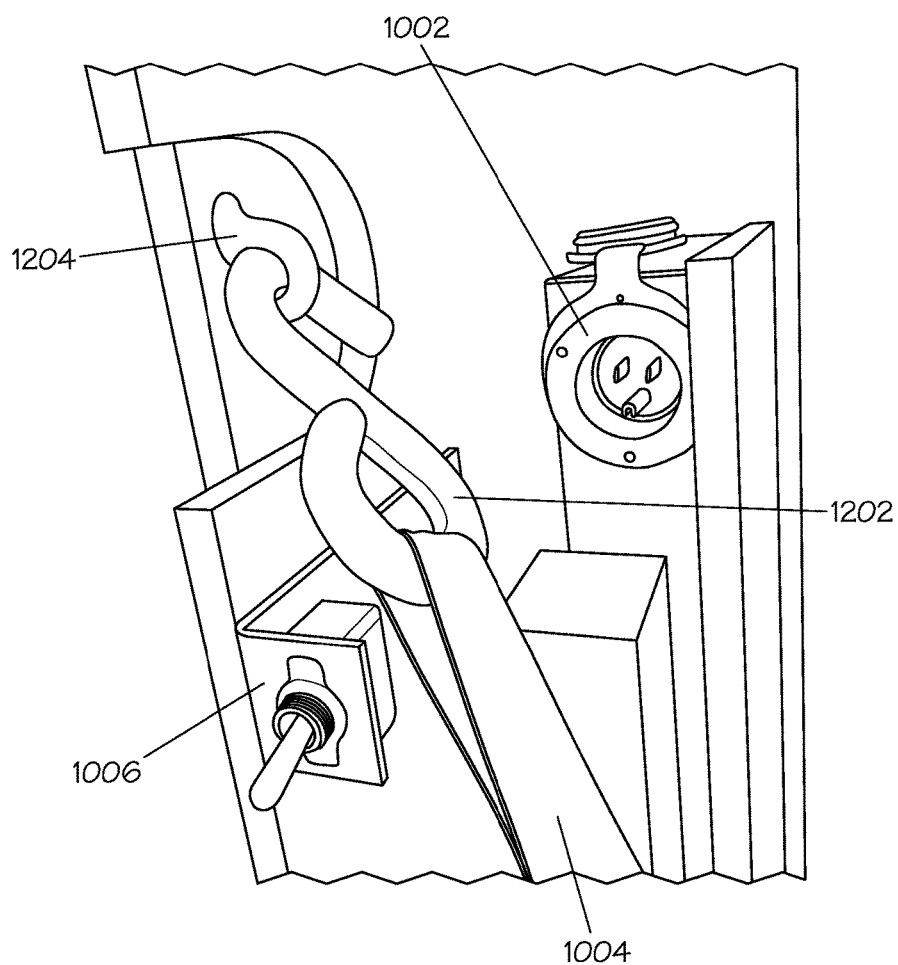
FIG. 12 depicts an alternate interior view of the automotive vehicle of FIG. 8 further depicting the temporary attachment of the water storage to the floor.

FIG. 12 depicts an alternate interior view of the automotive vehicle 100 of FIG. 8 further depicting the temporary attachment of the water storage 804 to the floor 206. An anchor 1204 of the water storage 804 may be connected to a hook 1202 of the ratchet strap 1004.

Due to the temporary attachment of the amenities described above, the amenities may be removed without damaging the automotive vehicle 100. Therefore, conversion back from an RV to an automotive vehicle 100 may be cost effective. The automotive vehicle 100 may be sold without the amenities. Furthermore, the automotive vehicle 100 may further be repurposed for other uses, because removal of the amenities returns the automotive vehicle 100 to its original configuration as manufactured and originally sold to a customer. Thus, the value of the automotive vehicle 100 may not necessarily be reduced due to degraded condition of the amenities or damage caused by installing or removing the amenities.

Figure 13:
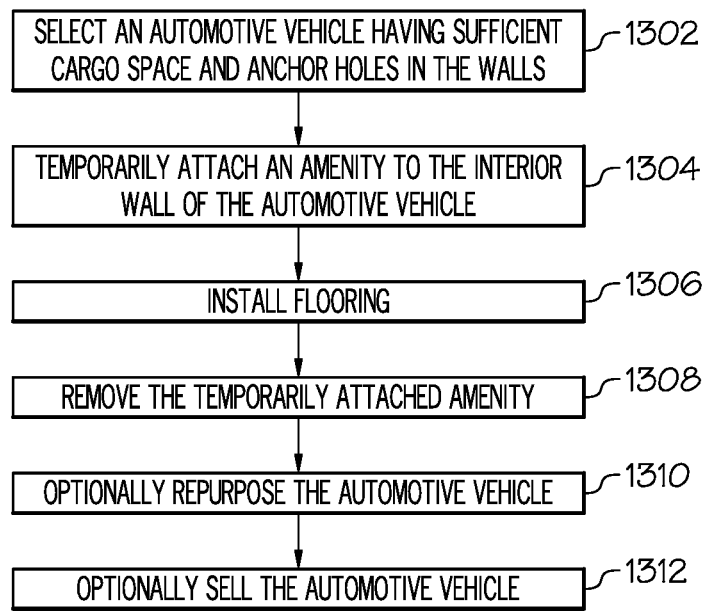
FIG. 13 depicts a method of modifying an automotive vehicle into an RV while retaining the value of the automotive vehicle in accordance with the principles of the present invention.

FIG. 13 depicts a method of modifying an automotive vehicle 100 into an RV while retaining the value of the automotive vehicle 100 in accordance with the principles of the present invention. The method of FIG. 13 may be performed in the order depicted and described herein, in some embodiments.

In step 1302, an automotive vehicle 100 may be selected. For example, sufficient cargo space for one or more amenities may be a factor in selecting the automotive vehicle 100. Furthermore, an automotive vehicle 100 having anchor holes in the interior walls 202 may be selected. An example appropriate automotive vehicle 100 is the Ford Transit.

In step 1304, one or more amenities may be temporarily attached to the interior walls 202 of the automotive vehicle 100. The amenity may be attached by any method or structure that does not damage the wall 202. For example, steel wire may be attached to the amenity and the wall 202.

In optional step 1306, the flooring 404 may be installed to frictionally fit against one or more walls 202 and the amenity. The flooring 404 may be positioned on the floor 206 such that the flooring 404 may rest against a side of the amenity proximate the floor. Furthermore, the flooring 404 may prevent sliding of the amenity when the automotive vehicle 100 is moving. The flooring 404 may extend through the entire cargo space of the automotive vehicle 100. In such embodiments, the flooring 404 may cushion water storage 804 and other electrical components. Alternatively, the flooring 404 may extend to the bedframe 802. In these embodiments, the flooring 404 may prevent sliding of the water storage 804 and the electrical components. In some embodiments, a wall or supports under the bedframe 802 may further prevent sliding of the water storage 804 and electrical components.

In step 1308, the temporarily attached amenity may be removed. This step may occur after degradation, weathering, or other damage one or more of the amenities. If flooring 404 was installed in optional step 1306, the flooring 404 may be removed before step 1308. Removal of the amenity and/or flooring 404 may not necessarily damage the wall 202.

In optional step 1310, the automotive vehicle 100 may be repurposed. For example, one or more rows of seating may be installed. Alternatively, shelving, toolboxes, or other storage may be installed.

In optional step 1312, the automotive vehicle 100 may be sold. This step may occur after removal of amenities or after repurposing the vehicle. Otherwise, the vehicle may be retained and reused in repurposed condition.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with each claim's language, wherein reference to an element in the singular is not intended to mean "one and only one" unless specifically so stated, but rather "one or more." All equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A modular recreational vehicle, comprising:
   an automotive vehicle comprising a cabin, the cabin comprising a floor and a wall surrounding at least part of an interior of the cabin, the wall comprising a preformed anchor hole, and
   one or more modular amenities attached to an anchor, wherein the anchor is temporarily attached to the wall at the preformed anchor hole.

2. The modular recreational vehicle of claim 1, wherein the anchor comprises at least one of: a bolt with a washer, a molly bolt, a toggle bolt, an S-hook, a ratchet strap hook, or a steel wire.

3. The modular recreational vehicle of claim 1, further comprising:
   a flooring on top of the floor, the flooring configured to fit around at least a portion of at least one of the one or more the modular amenities and the wall.

4. The modular recreational vehicle of claim 3,
   wherein the wall further comprises a protruding column, and wherein the flooring is cut to fit around the protruding column.

\* \* \* \* \*